(12) United States Patent
Gallagher

(10) Patent No.: US 9,676,097 B1
(45) Date of Patent: Jun. 13, 2017

(54) SYSTEMS AND METHODS FOR ROBOTIC DEVICE AUTHENTICATION

(71) Applicant: X Development LLC, Mountain View, CA (US)

(72) Inventor: Garratt Gallagher, Oakland, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 105 days.

(21) Appl. No.: 14/538,608

(22) Filed: Nov. 11, 2014

(51) Int. Cl.
*G05B 19/04* (2006.01)
*B25J 9/16* (2006.01)

(52) U.S. Cl.
CPC ............. *B25J 9/161* (2013.01); *B25J 9/16* (2013.01); *B25J 9/1697* (2013.01)

(58) Field of Classification Search
CPC ............ G01B 5/004; Y10T 74/20329; Y10T 74/20317; B25J 9/161; B25J 19/02; B25J 9/16; B25J 9/1697
USPC ............. 700/249, 254; 901/2, 9, 23, 27, 28
See application file for complete search history.

(56) References Cited

U.S. PATENT DOCUMENTS

| | | | | |
|---|---|---|---|---|
| 4,806,066 A * | 2/1989 | Rhodes | ............... | B25J 9/046 254/286 |
| 5,047,700 A * | 9/1991 | Szakaly | ............... | G05B 19/427 318/568.1 |
| 5,415,417 A * | 5/1995 | Reis, Jr. | ............... | A63F 9/30 273/447 |
| 5,741,113 A * | 4/1998 | Bacchi | ............... | B25J 9/042 414/744.5 |
| 5,742,624 A * | 4/1998 | Irie | ............... | G05B 19/058 714/799 |
| 5,765,444 A * | 6/1998 | Bacchi | ............... | B25J 9/042 414/744.5 |
| 5,944,476 A * | 8/1999 | Bacchi | ............... | B25J 9/042 414/744.3 |
| 6,126,381 A * | 10/2000 | Bacchi | ............... | B25J 9/042 414/754 |
| 6,155,768 A * | 12/2000 | Bacchi | ............... | H01L 21/67742 414/416.03 |
| 6,360,144 B1 * | 3/2002 | Bacchi | ............... | B25J 9/042 414/744.3 |
| 6,377,013 B2 * | 4/2002 | Suzuki | ............... | B62D 57/032 318/568.1 |
| 6,446,023 B1 * | 9/2002 | Ernst | ............... | B60C 23/0423 116/34 R |
| 2001/0020199 A1* | 9/2001 | Bacchi | ............... | B25J 9/042 700/245 |

(Continued)

*Primary Examiner* — Khoi Tran
*Assistant Examiner* — Jorge Peche
(74) *Attorney, Agent, or Firm* — McDonnell Boehnen Hulbert & Berghoff LLP

(57) ABSTRACT

A device is provided that includes a plurality of hardware segments. The device also includes a plurality of actuators to actuate the plurality of hardware segments. The device also includes a controller to cause at least one of the plurality of actuators to adjust positions of at least one of the plurality of hardware segments to correspond to a particular arrangement, to determine physical parameters of the device responsive to the adjustment of the positions, and to generate an identification code for the device based on the physical parameters. The physical parameters may include one or more of electrical parameters of the plurality of actuators or mechanical parameters of the plurality of actuators.

16 Claims, 9 Drawing Sheets

(56) References Cited

U.S. PATENT DOCUMENTS

| | | | | |
|---|---|---|---|---|
| 2002/0151993 A1* | 10/2002 | Olesen | ............... | H02P 23/0077 |
| | | | | 700/86 |
| 2003/0230998 A1* | 12/2003 | Miyaji | ............... | G05B 19/4148 |
| | | | | 318/625 |
| 2005/0017913 A1* | 1/2005 | Orfei | .................... | H01Q 15/165 |
| | | | | 343/757 |
| 2005/0150123 A1* | 7/2005 | Eaton | ..................... | G01B 5/004 |
| | | | | 33/503 |
| 2006/0034007 A1* | 2/2006 | Choi | .................. | G11B 5/59633 |
| | | | | 360/51 |
| 2006/0052974 A1* | 3/2006 | Chen | ..................... | G02B 23/16 |
| | | | | 702/150 |
| 2006/0179473 A1* | 8/2006 | Innami | ...................... | B25F 5/00 |
| | | | | 726/2 |
| 2007/0238927 A1* | 10/2007 | Ueno | ................ | A61B 1/00105 |
| | | | | 600/145 |
| 2009/0037022 A1* | 2/2009 | Teaford | ................. | B25J 9/1641 |
| | | | | 700/254 |
| 2009/0058348 A1* | 3/2009 | Ryu | .................. | G03G 15/5008 |
| | | | | 318/639 |
| 2009/0177325 A1* | 7/2009 | Uebayashi | ............. | B25J 9/1633 |
| | | | | 700/260 |
| 2009/0309531 A1* | 12/2009 | Hamahata | ............. | B25J 9/1674 |
| | | | | 318/565 |
| 2010/0062675 A1* | 3/2010 | Zahornacky | ........... | A63H 33/28 |
| | | | | 446/25 |
| 2010/0145515 A1* | 6/2010 | Nakanishi | ............. | B25J 9/1676 |
| | | | | 700/255 |
| 2010/0145519 A1* | 6/2010 | Keyl | ..................... | B25J 9/1674 |
| | | | | 700/258 |
| 2010/0170949 A1* | 7/2010 | Ishikawa | ............ | G06K 13/0875 |
| | | | | 235/439 |
| 2010/0268358 A1* | 10/2010 | Cantarelli | .............. | G05B 19/05 |
| | | | | 700/86 |
| 2010/0286826 A1* | 11/2010 | Tsusaka | ................ | B25J 9/1633 |
| | | | | 700/254 |
| 2011/0015785 A1* | 1/2011 | Tsusaka | ................ | B25J 9/0003 |
| | | | | 700/254 |
| 2011/0015787 A1* | 1/2011 | Tsusaka | ................ | B25J 9/0003 |
| | | | | 700/264 |
| 2011/0029133 A1* | 2/2011 | Okazaki | ............... | A61G 7/1017 |
| | | | | 700/258 |
| 2011/0050252 A1* | 3/2011 | Martinez | ............... | B81C 99/005 |
| | | | | 324/658 |
| 2011/0208442 A1* | 8/2011 | Lohmann | .......... | G05B 19/0428 |
| | | | | 702/33 |
| 2011/0297654 A1* | 12/2011 | Yoshikawa | .......... | B23K 26/046 |
| | | | | 219/121.62 |
| 2012/0146429 A1* | 6/2012 | Seol | ........................ | B62M 6/45 |
| | | | | 307/116 |
| 2012/0215358 A1* | 8/2012 | Gettings | .................. | B25J 5/005 |
| | | | | 700/259 |
| 2013/0233044 A1* | 9/2013 | Arth | ........................ | G05B 9/03 |
| | | | | 73/1.01 |
| 2013/0238123 A1* | 9/2013 | Mihara | .................... | B25J 9/102 |
| | | | | 700/245 |
| 2013/0319158 A1* | 12/2013 | Yamamoto | ............... | H02N 2/14 |
| | | | | 74/490.03 |
| 2013/0325182 A1* | 12/2013 | Setrakian | ................. | B25J 9/161 |
| | | | | 700/264 |
| 2015/0277426 A1* | 10/2015 | Ogata | .................... | B25J 9/1694 |
| | | | | 700/253 |

\* cited by examiner

SYSTEMS AND METHODS FOR ROBOTIC DEVICE AUTHENTICATION

BACKGROUND

Unless otherwise indicated herein, the materials described in this section are not prior art to the claims in this application and are not admitted to be prior art by inclusion in this section.

Robotic devices may be utilized in various industrial and service applications such as assembly, inspection, work in hazardous environments, and transportation. A robotic device may include various components such as sensors, cameras, manipulators, or robotic arms. Additionally, the robotic device may be remotely or autonomously operated to perform various tasks. For example, a computing device may communicate with the robotic device to provide operation instructions or to receive sensor measurements.

SUMMARY

In one example, a device is provided that includes a plurality of hardware segments. The device also includes a plurality of actuators to actuate the plurality of hardware segments. The device also includes a controller to cause at least one of the plurality of actuators to adjust positions of at least one of the plurality of hardware segments to correspond to a particular arrangement. The controller may also determine physical parameters of the device responsive to the adjustment of the positions. The controller may also generate an identification code for the device based on the physical parameters. The physical parameters may include one or more of electrical parameters of the plurality of actuators or mechanical parameters of the plurality of actuators.

In another example, a method is provided that includes a robotic device adjusting positions of at least one of a plurality of hardware segments in the robotic device to correspond to a particular arrangement. The robotic device may include one or more processors. The robotic device may also include a plurality of actuators to actuate the plurality of hardware segments. The method also includes determining physical parameters of the robotic device responsive to the adjustment of the positions. The physical parameters may include one or more of electrical parameters of the plurality of actuators or mechanical parameters of the plurality of actuators. The method also includes generating an identification code for the robotic device based on the physical parameters.

In yet another example, a method is provided that includes a computing device receiving an identification code from a robotic device. The computing device may include one or more processors. The robotic device may include a plurality of hardware segments. The identification code may be indicative of physical parameters of the robotic device that are associated with the plurality of hardware segments being in a particular arrangement. The method also includes performing a comparison between the physical parameters indicated by the identification code and given physical parameters in a dataset accessible to the computing device. The method also includes providing authenticated connectivity to the robotic device based on the comparison indicating that the physical parameters are within a threshold range to the given physical parameters. The method also includes providing an output indicating detection of a change to a configuration of the robotic device based on the comparison indicating that the physical parameters are outside the threshold range.

In still another example, a system is provided that includes means for a robotic device adjusting positions of at least one of a plurality of hardware segments in the robotic device to correspond to a particular arrangement. The robotic device may include one or more processors. The robotic device may also include a plurality of actuators to actuate the plurality of hardware segments. The system also includes means for determining physical parameters of the robotic device responsive to the adjustment of the positions. The physical parameters may include one or more of electrical parameters of the plurality of actuators or mechanical parameters of the plurality of actuators. The system also includes means for generating an identification code for the robotic device based on the physical parameters.

In still another example, a system is provided that includes means for a computing device receiving an identification code from a robotic device. The computing device may include one or more processors. The robotic device may include a plurality of hardware segments. The identification code may be indicative of physical parameters of the robotic device that are associated with the plurality of hardware segments being in a particular arrangement. The system also includes means for performing a comparison between the physical parameters indicated by the identification code and given physical parameters in a dataset accessible to the computing device. The system also includes means for providing authenticated connectivity to the robotic device based on the comparison indicating that the physical parameters are within a threshold range to the given physical parameters. The system also includes means for providing an output indicating detection of a change to a configuration of the robotic device based on the comparison indicating that the physical parameters are outside the threshold range.

These as well as other aspects, advantages, and alternatives, will become apparent to those of ordinary skill in the art by reading the following detailed description, with reference where appropriate to the accompanying figures.

DETAILED DESCRIPTION

Figure 1:
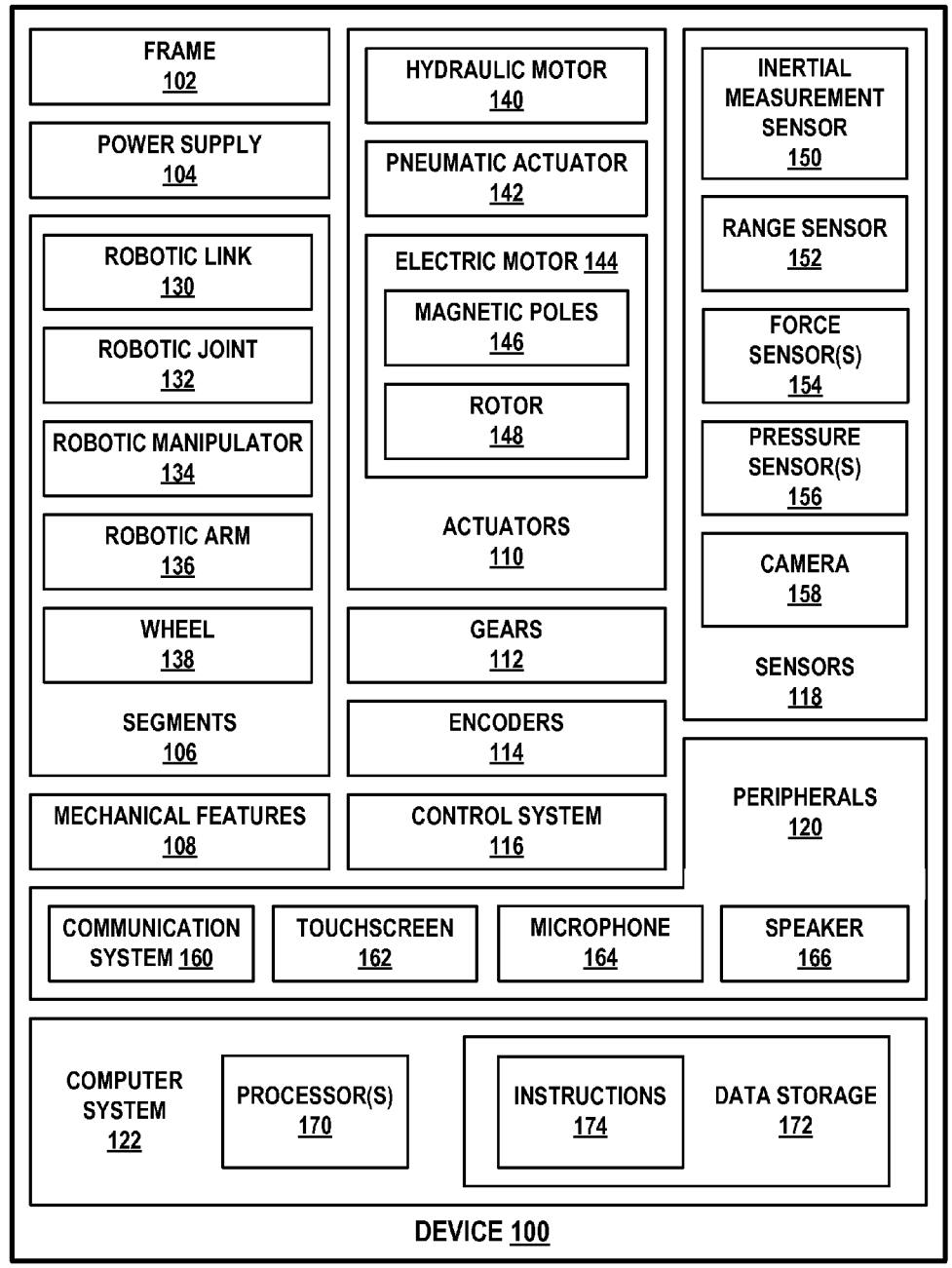
FIG. 1 is a simplified block diagram of a device, according to an example embodiment.

The following detailed description describes various features and functions of the disclosed systems and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

Within examples, a robotic device is provided that is configured to generate a unique identification code based on physical parameters of the robotic device. In practice, for example, the robotic device may include various components such as hardware segments (e.g., links, joints, etc.), actuators, encoders, sensors, screws, bolts, etc. These components may each have unique properties, such as shapes, sizes, physical properties, electrical properties, mechanical properties, or other properties, due to manufacturing variability. Further, during assembly or configuration of the robotic device, the various components may be coupled to one another in unique positions, orientations, offsets, biases, and the like. Thus, multiple robotic devices that are assembled according to a given configuration may each have a unique combination of physical parameters due to the manufacturing and/or coupling variability. Accordingly, the robotic device of the present disclosure may be configured to generate the identification code based on the physical parameters.

In some scenarios, an external computing system of the present disclosure may be configured to communicate with the robotic device to facilitate various operations of the robotic device. In one scenario, the robotic device may be a robotic arm in an assembly line, and the computing system may be a server that provides operation instructions to the robotic arm. In another scenario, the robotic device may be a drilling apparatus in a mine, and the computing system may be a remote computer that provides software updates to the drilling apparatus over a wired/wireless network. In yet another scenario, the computing system may be a maintenance computer operated by a supplier of the robotic device, and the robotic device may connect to the maintenance computer during maintenance for re-configuration and/or upgrades. Other scenarios are possible as well.

To facilitate communication between the robotic device and the external computing system, in some examples, the robotic device may provide the identification code, as a private/public key or any other key, to the computing system to receive authenticated connectivity with the computing system. In turn, the computing system may compare the identification code with a previously stored code to identify the robotic device or to authenticate various permissions for the robotic device in the computing system and beyond. Through this process, for example, the robotic device may receive authenticated connectivity to the computing system similarly to connectivity received by computers in a network. Additionally or alternatively, for example, the computing system may detect configuration changes to the robotic device through this process. For instance, the computing system may detect that an unauthorized entity tampered with the robotic device, and thereby determine that a warranty of the robotic device is void.

Various methods are possible for generating the identification code based on the physical parameters, and are contemplated herein within exemplary embodiments. Additionally, many parameters of the embodiments herein may be varied according to various applications. For example, methods herein may be implemented by various devices having various numbers of components and/or various arrangements of the components.

Referring now to the Figures, FIG. 1 is a simplified block diagram of a device 100, according to an example embodiment. As shown, the device 100 includes a frame 102, a power supply 104, hardware segments 106, mechanical features 108, actuators 110, gears 112, encoders 114, a control system 116, sensors 118, peripherals 120, and a computer system 122. In other embodiments, the device 100 may include more, fewer, or different components, and each component may include more, fewer, or different sub-components. Additionally, the components and sub-components shown may be combined or divided in any number of ways.

The frame 102 may be configured to support the various components of the device 100. For example, the frame 102 may include aluminum, titanium, other metal/metal-alloy, plastic, composite, wood, or any other solid material having shape and material characteristics to support the components of the device 100.

The power supply 104 may be configured to provide power to some or all of the components of the device 100. To this end, the power supply 104 may include, for example, a rechargeable lithium-ion or lead-acid battery. In some embodiments, one or more banks of batteries may be configured to provide electrical power. Other power supply materials and configurations are possible as well, such as non-rechargeable batteries, etc. For example, the power supply 104 may include a source of energy that powers some or all the components of the device 100. Example sources of energy may include gasoline, diesel, propane, other compressed gas-based fuels, ethanol, solar panels, batteries, or any other sources of energy. Further, for example, the power supply 104 may include wired (e.g., power cable, usb cable, etc.) and/or wireless connectivity (e.g., energy-harvesting antenna, etc.) with an external source (e.g., wall outlet, other power outlet, radiating antenna, etc.) to receive the energy and provide the power to the various components of the device 100. Additionally or alternatively, the power supply 104 may include a combination of fuel tanks, batteries, capacitors, flywheels, etc.

The plurality of moveable hardware segments 106 may include any combination of physical components that are actuated by the device 100 to interact with an environment of the device 100. As shown, the hardware segments 106 include a robotic link 130, a robotic joint 132, a robotic manipulator 134, a robotic arm 136, and a wheel 138. However, in some embodiments, the segments 106 may include a different combination of segments. For instance, the segments 106 may alternatively include three links, four joints, one manipulator, and no wheels. Other combinations are possible as well.

The link 130 may be a rigid component of the device 100 that has a particular shape. As such, the link 130 may include aluminum, titanium, other metal/metal-alloy, plastic, composite, wood, or any other solid material.

The joint 132 is a component of the device 100 that allows a rotational and/or translational degree of freedom to the link 130. For instance, the joint 132 may be a round rotating structure connected to the link 130 to allow the link 130 to rotate about an axis of the joint 132.

The manipulator 134 may be a machine or robotic mechanism that allows the device 100 to interact with various objects in the environment of the device 100. For example, the manipulator 134 may include a series of segments such as the link 130 and the joint 132 that are configured to grasp and/or move objects in the environment of the device 100, usually in several degrees of freedom. Alternatively, for example, the manipulator 134 may include an end-effector tool, such as a robotic wrist or a magnet, that is configured to manipulate the objects in the environment.

The arm 136 may include an interconnected set of links, joints and/or manipulators, such as the link 130, the joint 132, and/or the manipulator 134, to support or move an object through space.

The wheel 138 may include any type of wheel, such as a single wheel, double wheel, compound wheel, castor wheel, or any other wheel configured to rotate to move the device 100 along a heading (e.g., steering direction) of the wheel 38. The wheel 138 may include one or more solid materials suitable for performing the function of the wheel 138 such as plastic, composite, metal, metal compound, etc. By way of example, a castor wheel may be configured to roll along a straight line path, or mounted on a pivot (e.g., swivel, etc.) such that the wheel 138 may align with a direction of travel. Additionally, in some examples, the wheel 138 may include an energy-absorbing material (e.g., rubber, etc.) to facilitate operation and/or maintenance of the wheel 318. For example, the wheel 138 may include a tire coupled to a rim of the wheel 138.

The one or more mechanical features 108 may include any visible feature coupled to at least one of the segments 106. In one example, the mechanical features 108 may include screws, bolts, or other components that connect various parts (e.g., segments 106) of the device 100 to one another. In another example, the mechanical features 108 may include an indentation or a ridge that has a particular shape. In yet another example, the mechanical features 108 may include a sticker glued to the segments 106 or a mark engraved in the segments 106. Other examples are possible as well.

The plurality of actuators 110 may be configured to actuate the segments 106 and/or to maintain positions of the segments 106. As such, the actuators 110 may include any combination of actuators such as an electric motor, a steam motor, a sterling motor, a combustion motor, a hydraulic motor, a pneumatic motor, or any other actuator. In some examples, a given actuator may include multiple types of motors. For example, a gas-electric hybrid device may include a gasoline engine and an electric engine that are intermittently activated as the given actuator. Other examples are possible as well. As shown, the actuators 110 include a hydraulic motor 140, a pneumatic actuator 142, and an electric motor 144. However, in some embodiments, the actuators 110 may include a different number or combination of motors. For instance, the actuators 110 may alternatively include five electric motors only. Other combinations are possible as well.

The hydraulic motor 140 may include any mechanical actuator that converts hydraulic pressure and flow into torque and angular displacement (e.g., rotation). Example hydraulic motors include gear and vane motors, gerotor motors, axial plunger motors, radial piston motors, etc.

The pneumatic actuator 142 may include any actuator that converts energy in the form of a compressed fluid into mechanical motion. The mechanical motion may be rotary and/or linear, depending on the type of the pneumatic actuator 142. Example pneumatic actuators include tie rod cylinders, rotary pneumatic actuators, grippers, rodless pneumatic actuators, pneumatic artificial muscles, specialty actuators that combine rotary and linear motion, vacuum generators, etc.

The electric motor 144 may include any actuator that converts electrical energy into mechanical motion. For instance, the electric motor 144 may receive an electric current (e.g., AC current, DC current, etc.) from the power supply 104 and responsively provide the mechanical motion. To facilitate the energy conversion, an electric motor may operate according to various physical principles such as magnetic, electrostatic, piezoelectric, etc. As shown, the electrical motor 144 is of the magnetic variety. As such, the electric motor 144 includes a plurality of magnetic poles 146 arranged around a rotor 148. The magnetic poles 146, for example, may be formed as coils that are electronically switched by the device 100. In turn, the rotor 148 may include a magnet or other material that is attracted/repelled towards one or more of the magnetic poles 146. The resulting motion of the rotor 148 may correspond to the mechanical motion that is caused by the electrical energy received by the magnetic poles 146. Other arrangements for the electric motor 144 are possible as well such as coreless motors, axial rotor motors, servo motors, stepper motors, linear motors, etc.

The gear(s) 112 may be configured to couple the actuators 110 with the segments 106. Further, the gears 112 may be configured to provide a gear ratio that corresponds, for example, to a number of rotations of a given actuator about an axis of the given actuator to a single rotation of a given segment. Alternatively, the gear ratio provided by the gears 112 may correspond, for example, to a number of rotations of the given segment to a single rotation of the given motor. Thus, for example, the gears 112 may allow transmitting torques of the actuators 110 to the segments 106. In some examples, the gears 112 may be configured as a rotating machine part (e.g., cogwheel, etc.) having cut teeth, or cogs, which mesh with another toothed machine part having a different/same number of teeth to provide the gear ratio. Additionally, in some examples, the gears 112 may include more than one gear arranged as a transmission system to change speed, torque, and direction of rotation of the segments 106 relative to the actuators 110. Additionally, in some examples, the gears 112 may include other transmission components such as clutches, differentials, pulleys, belts, drive shafts, and/or other elements.

The encoders 114 may be coupled to the actuators 110 and configured to provide data indicative of motion and/or orientation of the actuators 110. For example, the encoders 114 may include a rotary encoder, a shaft encoder, or any other electro-mechanical device configured to convert an angular position/motion of a shaft of a given actuator to an analog or digital signal (e.g., the data, etc.). Various implementations are possible for the encoders 114 such as mechanical (e.g., metal disc containing a set of concentric rings of openings), optical (e.g., glass/plastic with transparent and opaque areas), magnetic (e.g., disc that includes a series of magnetic poles), capacitive (e.g., asymmetrical shaped disc rotated within the encoder to adjust capacitance between two electrodes), or any other implementation.

In some examples, the data provided by the encoders 114 may indicate a change in a position (e.g., orientation) of a given actuator of the actuators 110. Further, for example, the encoders 114 may provide a signal (e.g., index pulse, etc.) indicative of the given actuator being at a particular orientation. Further, in some examples, the data provided by the encoders 114 may be processed by the device 100 to determine speeds of the actuators 110. For example, a time measurement may be obtained by the device 100 in addition to the data from the encoders 114 to determine the speeds of the actuators 110.

Accordingly, in some examples, the encoders 114 may include an incremental encoder configured to provide the data indicative of motion of the actuators 110. In these examples, the device 100 may cause actuators 110 to actuate one or more of the segments 106, until the signal (e.g., index pulse, etc.) of the encoders 114 is detected to determine the particular orientations of the actuators 110.

Additionally or alternatively, in some examples, the encoders 114 may include an absolute encoder configured to provide the data. The absolute encoder, for example, may be configured to detect motion of the actuators 110 even if the absolute encoder is not provided with power. In these examples, the encoders 114 may provide the data indicative of the orientations of the actuators 110 without the device 100 actuating the segments 106 until the signal (e.g., index pulse) is received from the encoders 114.

The control system 116 may be configured to control operation of the device 100 and/or components thereof. For instance, the control system 116 may include any combination of mechanisms configured to control the segments 106. For example, the device 100 may be an assembly line robot, and the control system 116 may control the robotic arm 136 to move an object from one location to another.

In some examples, the control system 116 may be implemented as a control loop that receives inputs from the encoders 114 and provides output signals to control power provided to the actuators 110 to achieve a particular speed of motion of the segments 106. Example control loops may include open loops, closed loops, etc. For example, the control system 116 may be implemented as proportional-integral-derivative (PID) controller. Other examples are possible as well. Thus, for example, the control system 116 may be configured to measure and/or control electric signals in the actuators 110. The control system 110 may additionally or alternatively include components other than those shown in FIG. 1.

The sensor(s) 118 may include a number of sensors configured to sense information about an environment in which the device 100 is located, as well as sensing components in the device 100. Further, in some examples, the sensors 118 may include one or more actuators (not shown) to actuate some or all of the sensors 118. As shown, the sensors of the sensor system 204 include an inertial measurement sensor (IMS) 150, a range sensor 152, one or more force sensors 154, one or more pressure sensors 156, and a camera 158. The sensors 118 may include additional sensors as well, including, for example, sensors that monitor internal systems of the device 100 (e.g., an O$_2$ monitor, a fuel gauge, a temperature monitor, etc.). Other sensors are possible as well.

The IMS 150 may be any combination of sensors configured to sense position and orientation changes of the device 100 or components thereof based on inertial acceleration. In some embodiments, the combination of sensors may include, for example, accelerometers and gyroscopes. Other combinations of sensors are possible as well.

The range sensor 152 may be any sensor configured to sense objects in the environment in which the device 100 is located as well as various components of the device 100 (e.g., segments 106). For example, the range sensor 152 may include a RADAR (e.g., using radio signals), a LIDAR (e.g., using lasers), an Infrared range sensor (e.g., using infrared), or any other range sensor. For example, the range sensor 152 may include a light source and/or a light detector configured to emit light and detect reflections of the light. Further, in some examples, the range sensor 152 may be configured to operate in a coherent (e.g., using heterodyne detection) or an incoherent detection mode. In some embodiments, in addition to sensing the objects/components, the range unit 152 may additionally be configured to sense the speed and/or heading of the objects/components.

The force sensor(s) 154 may include any combination of sensors configured to measure force at various parts of the device 100. For example, the force sensors 154 may include a force gauge, spring scale, strain gauge, load cell, load pin, or any other force sensor. The force sensors 154 may be arranged in various parts of the device 100 to measure forces along the device 100, and provide an indication of the forces to the device 100. For example, a strain gauge may be placed between the robotic link 130 and the robotic joint 132 to measure the force between the two components. Further, in some examples, the force sensors 154 may be configured to measure a weight of one or more of the components in the device 100. For example, the device 100 may adjust a position of a given segment to an upright position, and an associated force sensor may thus measure the weight of the given segment.

The pressure sensor(s) 156 may include any combination of sensors configured to measure pressure at various parts of the device 100. For example, the pressure sensors 156 may include absolute pressure sensors, gauge pressure sensors, vacuum pressure sensors, differential pressure sensors, sealed pressure sensors, etc. The pressure sensors 156 may be arranged in various parts of the device 100 to measure various pressures. For example, the pressure sensors 156 may measure pressure of fluid in the hydraulic motor 140, or pressure at an interface between two of the segments 106, among other possibilities.

The camera 158 may include any camera (e.g., a still camera, a video camera, etc.) configured to capture images of the environment in which the device 100 is located or to capture images of the various components of the device 100. To this end, the camera may take any of the forms described above or may take any other form. The sensors 118 may additionally or alternatively include components other than those shown in FIG. 1.

Peripherals 120 may be configured to allow the device 100 to interact with external sensors, other devices, objects in the environment of the device 100, and/or a user, etc. To this end, the peripherals 120 may include, for example, a communication system 160, a touchscreen 162, a microphone 164, and/or a speaker 166.

The communication system 160 may include a wired communication interface (e.g., parallel port, USB, etc.) and/or a wireless communication interface (e.g., antennae, transceivers, etc.) to receive and/or provide signals from/to external devices. In some examples, the communication system 160 may receive instructions for operation of the device 100. Additionally or alternatively, in some examples, the communication system 160 may provide output data such as data from the encoders 114 and/or data from the sensors 118.

The touchscreen 162 may be used by a user to input commands to the device 100. To this end, the touchscreen 162 may be configured to sense at least one of a position and a movement of a user's finger via capacitive sensing, resistance sensing, or a surface acoustic wave process, among other possibilities. The touchscreen 162 may be capable of sensing finger movement in a direction parallel or planar to the touchscreen surface, in a direction normal to the touchscreen surface, or both, and may also be capable of sensing a level of pressure applied to the touchscreen surface. The touchscreen 162 may be formed of one or more translucent or transparent insulating layers and one or more translucent or transparent conducting layers. The touchscreen 162 may take other forms as well. Further, in some examples, the touchscreen 162 may be configured as a display for providing output from various components of the device 100, such as the sensors 118.

The microphone 164 may be configured to receive audio (e.g., a voice command or other audio input) from a user of the device 100. Similarly, the speakers 166 may be configured to output audio to the user of the device 100. The peripherals 120 may additionally or alternatively include components other than those shown in FIG. 1.

The computer system 114 includes one or more processors 180 and data storage 182. In some examples, some components of the computer system 114 may be distributed across multiple computing devices. For example, the data storage 182 may be included in an external data storage device communicatively linked with the device 100. Other examples are possible as well. However, for the sake of example, the components are shown and described as part of the computer system 114.

The computer system 122 may be configured to transmit data to and receive data from one or more of the various components of the device 100. To this end, the computer system 122 may be communicatively linked to one or more of the power supply 104, the actuators 110, the encoders 114, the control system 116, the sensors 118, and/or the peripherals 120 by a system bus, network, and/or other connection mechanism (not shown in FIG. 1).

The computer system 122 may be further configured to interact with and control one or more components of the device 100. For example, the computer system 122 may be configured to provide instructions to the control system 116 to cause the actuators 110 to adjust positions of the segments 106. As another example, the computer system 122 may be configured to cause the camera 158 to capture images of the various components of the device 100. As yet another example, the computer system 122 may be configured to store and execute instructions for displaying visual information on the touchscreen 162. Other examples are possible as well.

The processor(s) 170 may comprise one or more general-purpose processors and/or one or more special-purpose processors. To the extent the processor 170 includes more than one processor, such processors may work separately or in combination. For example, a first processor of the processor(s) 170 may operate the actuators 110, and a second processor of the processor(s) 170 may operate the sensors 118, etc. The data storage 172, in turn, may comprise one or more volatile and/or one or more non-volatile storage components, such as optical, magnetic, and/or organic storage, and the data storage 172 may be integrated in whole or in part with the processor 170.

In some embodiments, the data storage 172 may contain instructions 174 (e.g., program logic) executable by the processor 170 to perform various functions of the device 100. The data storage 172 may contain additional instructions as well, including instructions to transmit data to, receive data from, interact with, and/or control one or more of the actuators 110, the encoders 114, the control system 116, the sensors 118, the peripherals 112, and/or any other component of the device 100. Although not illustrated in FIG. 1, the data storage 172 may store other data such as data collected by the encoders 114, the control system 116, and/or data from the sensors 118, etc. The computer system 122 may additionally or alternatively include components other than those shown in FIG. 1.

In some embodiments, one or more of the actuators 110, the encoders 114, the control system 116, the sensors 118, and the peripherals 120 may be configured to work in an interconnected fashion with other components within and/or outside their respective systems. Further, the device 100 may include one or more elements in addition to or instead of those shown. For example, the device 100 may include one or more additional interfaces and/or power supplies. Other additional components are possible as well. In such embodiments, the data storage 172 may further include instructions (e.g., instructions 174, etc.) executable by the processor 170 to control and/or communicate with the additional components.

Still further, while each of the components and systems are shown to be integrated in the device 100, in some embodiments, one or more components or systems may be removably mounted to or otherwise connected (e.g., mechanically or electrically) to the device 100 using wired or wireless connections. The device 100 may take other forms as well. Further, in some embodiments, the device 100 may include more, fewer, or different components than those shown in FIG. 1.

In some examples, the device 100 may be configured to generate an identification code based on physical parameters of the various components of the device 100.

In one example, physical parameters (e.g., electrical properties, mechanical properties, etc.) of the actuators 110 may be unique to the device 100. In this example, the device 100 may be configured to cause one or more of the actuators 110 to actuate the segments 106, and responsively measure the physical parameters of the actuators 110 (e.g., resistance, current, etc.). As a variation of this example, the device 100 may measure other physical parameters of the actuators 110, such as positions of the magnetic poles 146. For example, the device 100 may measure biases of the encoders 114 that correspond to the positions of the magnetic poles 146. In turn, the device 100 may utilize the measured parameters to generate the identification code.

In another example, the device 100 may be configured to cause the actuators 110 to actuate the segments 106 to correspond to a particular arrangement. In this example, the device 100 may then measure various parameters, such as the outputs of the force sensors 154, the pressure sensors 156, the control system 116, or any other parameter, in response to adjusting the segments to the particular arrangement. In turn, the device 100 may utilize these parameters to generate the identification code. As a variation of this example, the device 100 may capture an image of the mechanical features 108 via the camera 158 when the segments 106 are in the particular arrangement, measure orientations of the mechanical features 108 in the image, and thereby utilize the orientations for generating the identification code.

Other examples are possible as well and are described in greater detail within embodiments of the present disclosure.

Figure 2:
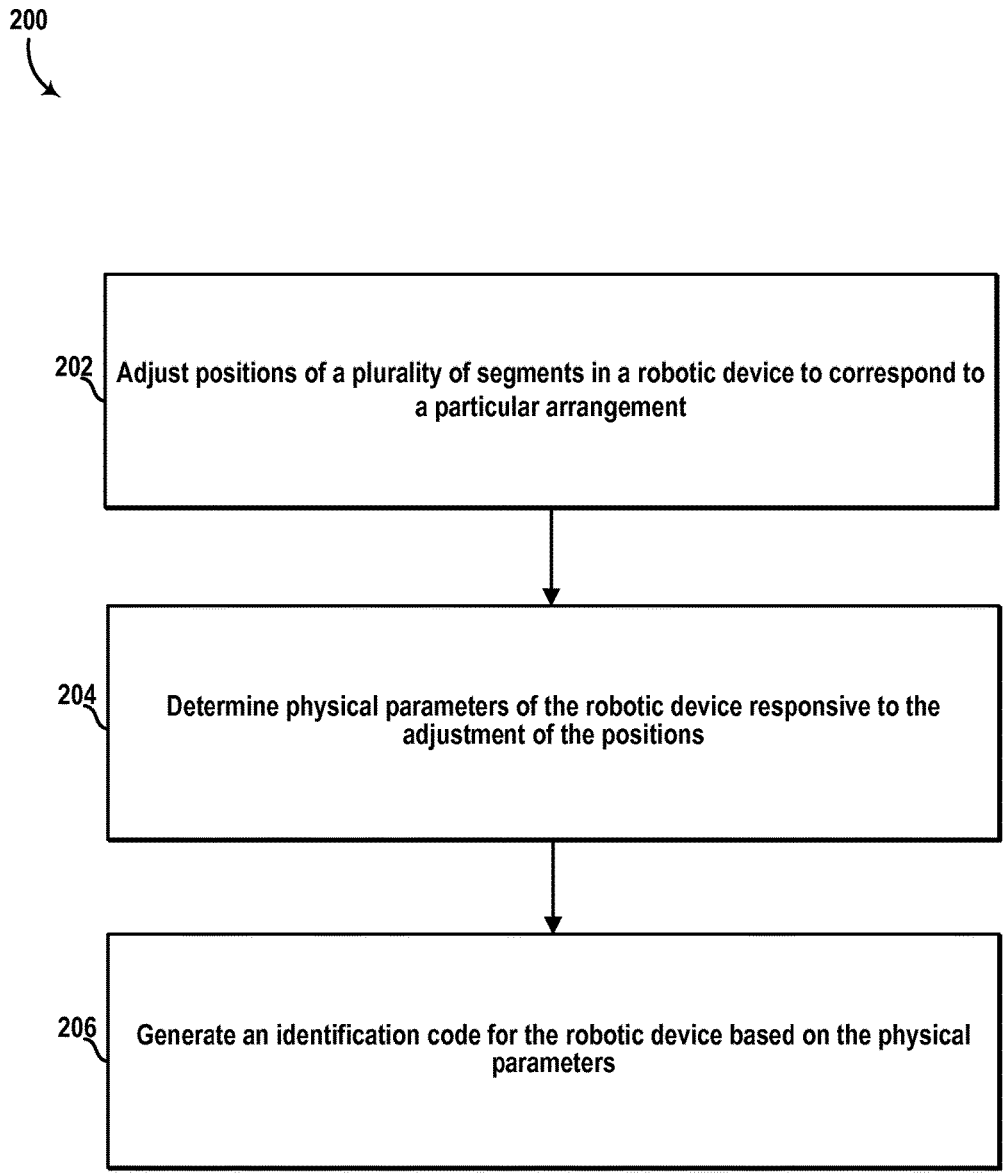
FIG. 2 is a block diagram of a method, according to an example embodiment.

FIG. 2 is a block diagram of a method 200, according to an example embodiment. Method 200 shown in FIG. 2 presents an embodiment of a method that could be used the device 100, for example. Method 200 may include one or more operations, functions, or actions as illustrated by one or more of blocks 202-206. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block in FIG. 2 may represent circuitry that is wired to perform the specific logical functions in the process.

In some examples, the functions of the method 200 and other processes and methods herein may be performed by a robotic device such as the device 100. For example, the functions of the method 200 may be implemented as the program instructions 174 of the device 100. Additionally or alternatively, some or all of the functions herein may be performed by an external computing device, such as a server, that is in communication with the device 100. For example, the external computing device may communicate with the communication system 160 of the device 100 to provide instructions for the device 100 to perform some or all of the functions of the method 200. Other examples are possible as well.

At block 202, the method 200 includes adjusting positions of at least one of a plurality of segments in a robotic device to correspond to a particular arrangement. The robotic device may be similar to the device 100. In turn, the plurality of segments may be similar to the hardware segments 106 of the device 100. For example, the plurality of segments may include any combination of robotic links, robotic joints, robotic manipulators, robotic arms, or wheels, which are similar, respectively, to the link 130, the joint 132, the manipulator 134, the arm 136, or the wheel 138 of the device 100. Further, for example, the robotic device may include one or more processors similar to the processor 170 of the device 100. In some examples, the robotic device may include a plurality of actuators to actuate the plurality of segments, similarly to the actuators 110 of the device 100.

Thus, for instance, the robotic device may cause at least one of the plurality of actuators to adjust the positions of the at least one of the plurality of segments to correspond to the particular arrangement. By way of example, the particular arrangement may correspond to a link being in a vertical position and a manipulator being in a horizontal position. Other arrangements are possible as well.

In one embodiment, the particular arrangement is an arrangement provided by a manufacturer of the robotic device. For example, the particular arrangement may be a maintenance arrangement, such as an arrangement of all the links at 90 degree angles to one another, or any other arrangement. Thus, in one example, the particular arrangement may be stored in a memory of the robotic device, such as a pre-determined arrangement provided to a group of robotic devices during manufacture/configuration among other possibilities. In another example, the particular arrangement may be provided by an external computing device in communication with the robotic device. For instance, the external computing device may provide instructions to the robotic device to adjust the positions of the segments to the particular arrangement. In another embodiment, the particular arrangement is a home position for the robotic device, such as an arrangement that the robotic device is configured to return to during initialization or in response to receiving a home command, for example. Other arrangements are possible as well.

In some examples, the method 200 may also include obtaining an indication of the particular arrangement from a memory accessible to the robotic device. For example, the robotic device may obtain the indication of the particular arrangement from data storage similar to the data storage 172 of the device 100. Additionally or alternatively, in some examples, the method 200 may also include receiving the indication of the particular arrangement from an external computing device. For example, the robotic device may utilize a communication interface, similar to the communication system 160 of the device 100, to receive the indication of the particular arrangement from a server or other computing system.

In some examples, the method 200 may also include adjusting the positions of the segments in accordance with a pattern of arrangements. By way of example, the robotic device may adjust the position of a manipulator to a first position, then to a second position, and then to a third position in a particular order of the pattern. Similarly, in this example, the robotic device may adjust the positions of one or more other segments also in accordance with the pattern.

At block 204, the method 200 includes determining physical parameters of the robotic device responsive to the adjustment of the positions. In some examples, the physical parameters may indicate properties of the robotic device (or components thereof) during the adjustment of the positions. Additionally or alternatively, in some examples, the physical parameters may indicate properties of the robotic device (or components thereof) after the adjustment of the positions (e.g., when the segments are in the particular arrangement).

In some examples, the physical parameters include calibration parameters such as offsets between actuators and encoders, sensor biases, or any other calibration data. Additionally or alternatively, in some examples, the physical parameters include other parameters (e.g., generic parameters, aesthetic parameters, chemical parameters, etc.) for various properties of the robotic device, such as sizes, shapes, weights, colors, material composition, etc., of the various components of the robotic device. Other examples are possible as well.

In some embodiments, the method 200 also includes selecting the physical parameters based on a likelihood of measurement variability. By way of example, some physical parameters such as a pressure reading may be affected by local environmental conditions (e.g., temperature, humidity, etc.) or other factors (e.g., age of component, etc.). As another example, an image from a camera may vary over time due to aging of the camera. In these examples, such parameters may be excluded from the physical parameters to improve consistency of the determined physical parameters.

Additionally or alternatively, in some embodiments, the method 200 also includes adjusting at least one of the physical parameters to reduce the measurement variability. In one example, when measuring pressure, the value of the pressure may be adjusted according to temperature of the environment (e.g., via lookup table, bias calculation, etc.). In another example, the robotic device may assign a threshold range of values to a given physical parameter value. For instance, an encoder value of a particular actuator in the robotic device may be expected to be in the range of 30+/−5 due to variability during assembly of the robotic device. However, due to the encoder's measurement variability, the encoder may return a slightly different value every time the measurement is performed even if there was no change to an actual configuration of the particular actuator. For instance, the encoder may return 31 in a first measurement, 32 in a second measurement, and 29 in a third measurement even if the actual configuration of the actuator did not change. In turn, in this instance, the robotic device may assign the given physical parameter value of 30 to all encoder readings in the range 29-32. Such adjustment may improve consistency of the determined physical parameters, while still detecting differences in configuration (e.g., ranges 25-27, 28-32, and 33-35 may still be distinguished from one another). Further, for example, the ranges may be determined by applying any statistical process such as measurement of a variance of the mean of the encoder readings.

In some scenarios, the physical parameters may include physical properties of the plurality of actuators. In line with the discussion above, each of the plurality of actuators may have unique physical properties due to manufacturing/coupling variability, for example. Accordingly, for example, the physical parameters may include electrical parameters and/or mechanical parameters of one or more of the plurality of actuators. By way of example, the robotic device may measure the electrical parameters, such as voltages, currents, resistances, etc., across terminals of the plurality of actuators and/or mechanical parameters, such as orientations, positions, displacements, etc. Further, in examples where the plurality of actuators include a hydraulic motor (e.g., the hydraulic motor 140) or a pneumatic motor (e.g., the pneumatic actuator 142), the robotic device may measure mechanical parameters such as pressure inside these actuators (e.g., using the pressure sensors 156, etc.).

In some examples, the robotic device may include a plurality of encoders, similarly to the encoders 114 of the device 100, which are coupled to the plurality of actuators. In these examples, the plurality of encoders may provide data indicative of motion (e.g., speed, direction of motion, etc.) or orientation (e.g., rotational position, displacement position, etc.) of the plurality of actuators about axes of the plurality of actuators. For example, in response to a given actuator rotating about its axis, the encoders may provide signals indicating the motion (e.g., speed, acceleration, etc.) or the orientation (e.g., rotational position, etc.) of the given actuator. Thus, in these examples, the method 200 may also include determining the data from the plurality of encoders, and determining the physical parameters to include the motion or the orientation indicated by the data from the encoders. For example, the physical parameters may indicate speed of rotation of the actuators, final orientations of the actuators, etc.

In some examples, the plurality of actuators may include an electric motor similarly to the electric motor 144 of the device 100. Further, the electric motor may include a plurality of magnetic poles similarly to the magnetic poles 146 of the device 100. In line with the discussion above, the electric motor may also have unique physical parameters due to manufacturing variability. For example, the positions of the magnetic poles and distances between the magnetic poles may vary between similar electric motors.

Accordingly, in these examples, the method 200 may also include determining the positions of the plurality of magnetic poles, and including these positions in the physical parameters. By way of example, the robotic device may energize some or all of the magnetic poles in a pre-determined sequence. When one of the magnetic poles is energized, the electric motor may rotate towards or away from the energized magnetic pole to settle at a particular position. In this example, the electric motor may be coupled to an encoder (e.g., encoders 114) and the robotic device may store an encoder value that corresponds to the particular position. Similarly, in this example, the robotic device may then energize the other magnetic poles in the pre-determined sequence and store the encoder data that indicates these magnetic pole positions, and may then include an indication of these magnetic pole positions in the physical parameters.

Therefore, in these examples, the method 200 may also include providing an electric current to one magnetic pole of the plurality of magnetic poles, and obtaining encoder data indicative of the motion or the orientation of the electric motor responsive to providing the electric current to the one magnetic pole.

Additionally or alternatively, in some scenarios, the physical parameters may include parameters other than the physical properties of the plurality of actuators. For example, the robotic device may include one or more mechanical features and a camera that are similar, respectively, to the mechanical features 108 and the camera 158 of the device 100. The mechanical features, for example, may include screws, bolts, indentations, ridges, stickers, marks, or any other visible features that are coupled to the robotic device during assembly and/or configuration. Due to manufacturing/coupling variability, in some examples, the mechanical features may be unique to the robotic device. For example, if a screw is fastened to connect two components of the robotic device to one another, an orientation of the fastened screw may vary between one robotic device and another.

Accordingly, in this example, the method 200 may also include obtaining an image of the one or more mechanical features coupled to one or more of the plurality of segments. The image, for example, may be obtained from a camera (e.g., the camera 158) when the plurality of segments are in the particular arrangement. Alternatively or additionally, in some examples, a series of images may be obtained as the plurality of segments move towards the particular arrangement. In this example, the method 200 may also include determining the physical parameters to include an indication of the orientations of the one or more mechanical features indicated by the image (or the series of images). For example, orientations of various screws, bolts, etc. may be computed by a controller of the robotic device, such as the computing system 122 of the device 100, based on the image and may then be indicated in the physical parameters.

In some examples, the physical parameters may alternatively or additionally include other parameters. For example, the robotic device may obtain sensor readings that are associated with the particular arrangement from sensors similar to the sensors 118 of the device 100. In one example, the robotic device may determine an acceleration of one or more segments during the adjustment of the positions using an inertial measurement sensor (e.g., the IMS 150). In another example, the robotic device may determine a distance between two segments using a range sensor (e.g., the range sensor 152). In yet another example, the robotic device may determine a force (or weight) at a particular location in the robotic device when the segments are in the particular arrangement (or during motion of segments towards the particular arrangement), by using a force sensor (e.g., the force sensor 154). Other examples are possible as well according to availability and configuration of various sensors in the robotic device. In line with the discussion above, the various sensor readings may vary between two similar robotic devices due to manufacturing/coupling variability of the two robotic devices (or the sensors).

Accordingly, in these examples, the method 200 may also include determining physical parameters of the robotic device based on sensor output of sensors in the robotic device responsive to the adjustment of the positions of the plurality of segments.

At block 206, the method 200 includes generating an identification code for the robotic device based on the physical parameters. The identification code, for example, may be formatted as a private/public key that identifies the robotic device in a network or any other code that identifies the robotic device. Accordingly, for example, the identification code may be generated in various formats such as a text string, a byte code, an encrypted code, a data structure, an XML file, or any other format according to various applications of the robotic device. Further, in some examples, the identification code may be structured to indicate values of the various physical parameters.

In some examples, the method 200 may also include providing the identification code to an external computing device. For example, the robotic device may provide the identification code to a maintenance computer, a control computer, a network node, or any other computer in communication with the robotic device. In turn, the method 200 may also include receiving authenticated connectivity with the external computing device responsive to provision of the identification code. For example, the external computing device may authenticate the identification code, and thereby tether the robotic device to the external computing device and provide operation instructions, updates, upgrades, or any other functionality of the external computing device.

Further, in some examples, the external computing device may analyze the identification code to detect any unauthorized changes to a configuration of the robotic device. For example, the external computing device may initiate a process to terminate a warranty of the robotic device if the changes to the configuration were unauthorized. Other examples are possible as well and are described in greater detail within exemplary embodiments of the present disclosure.

Figure 3A:
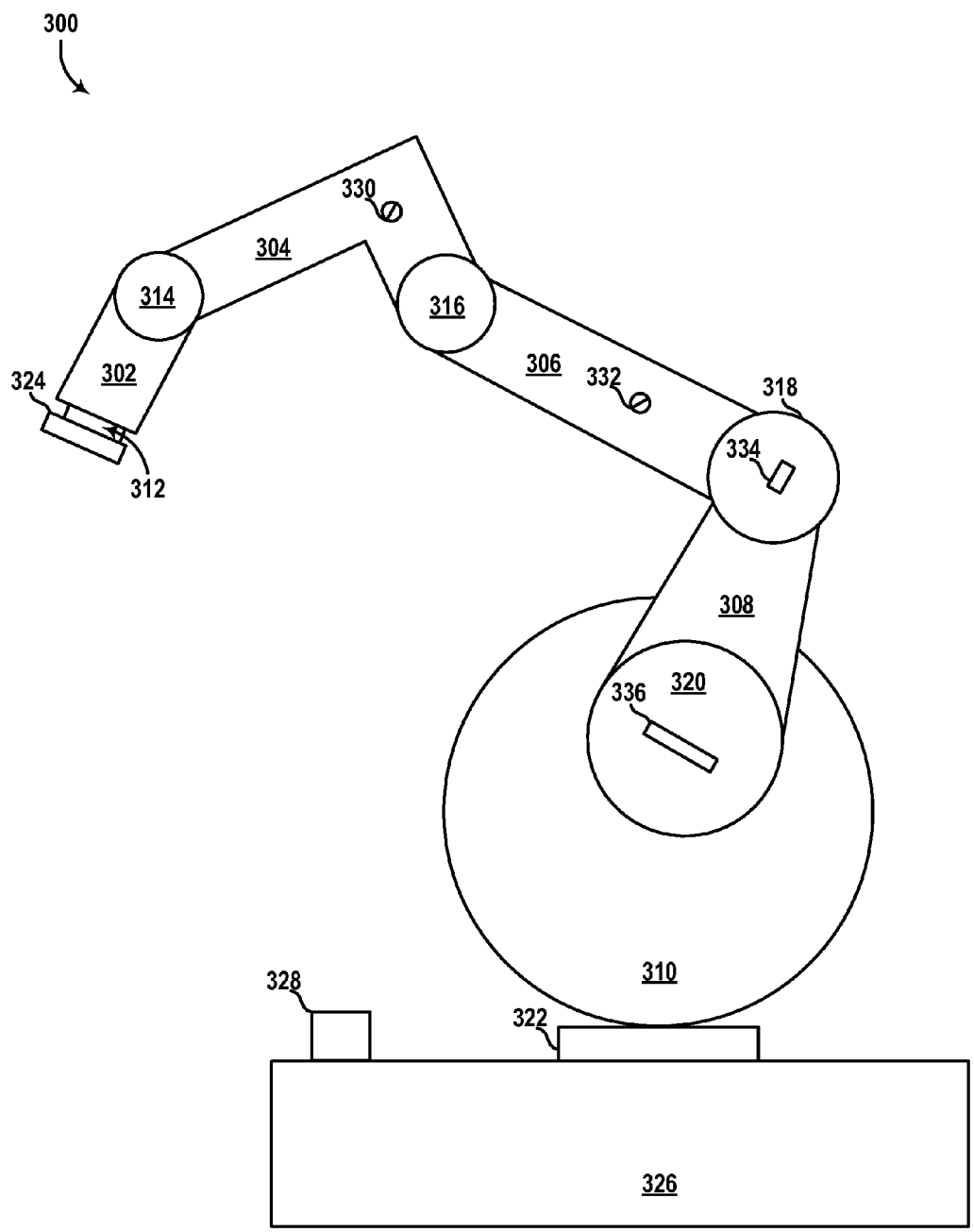
FIGS. 3A-3B illustrate arrangements of hardware segments in a robotic device, according to an example embodiment.
Figure 3B:
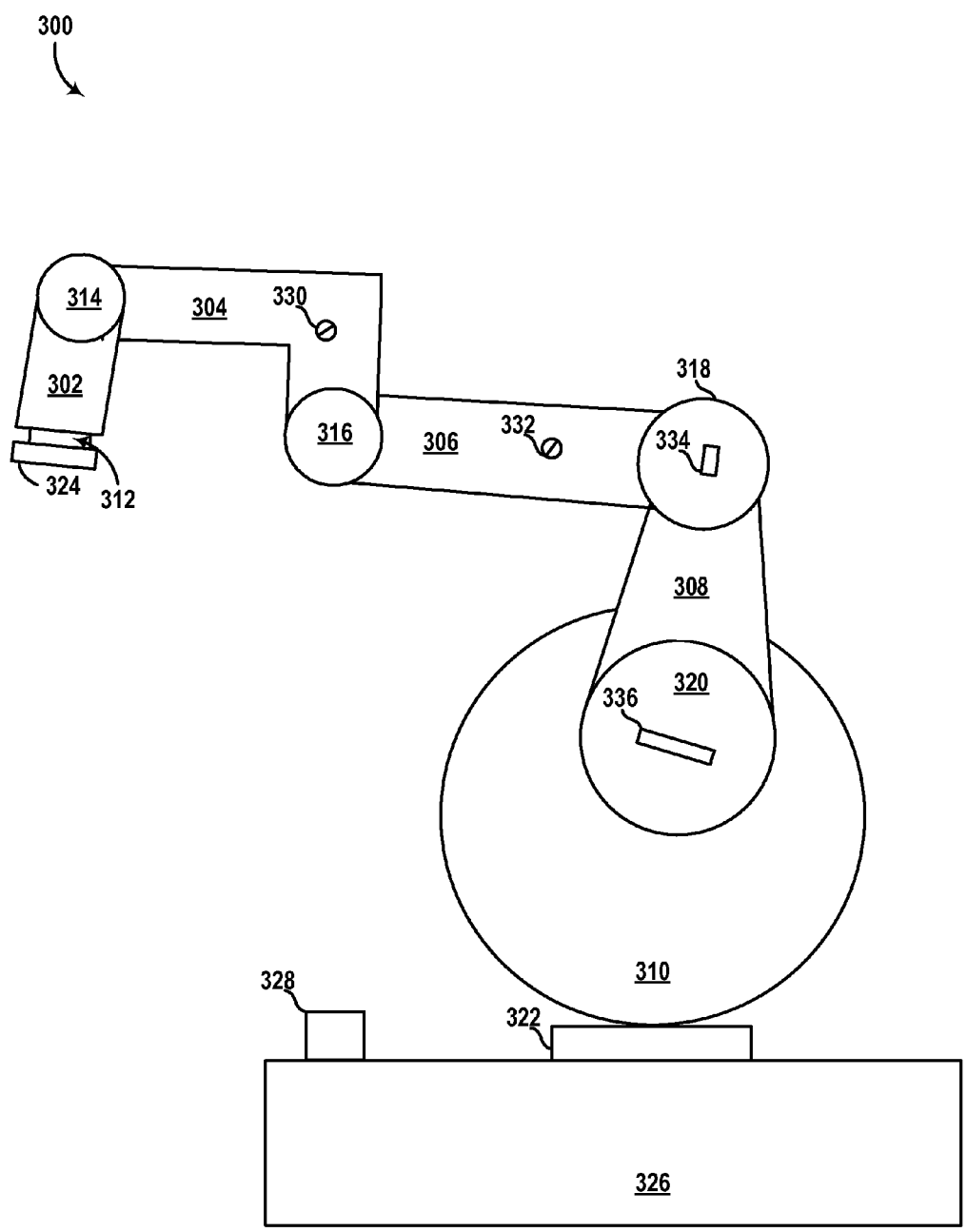

FIGS. 3A-3B illustrate arrangements of hardware segments in a robotic device 300, according to an example embodiment. The device 300 may be similar to the device 100 of FIG. 1, and may be configured to perform functions of the method 200 of FIG. 2. As shown, the device 300 includes robotic links 302-310, robotic joints 312-322, robotic manipulator 324, frame 326, a camera 328, and mechanical features 330-336 that are similar, respectively, to the robotic link 130, the robotic joint 132, the robotic manipulator 134, the frame 102, the camera 158, and the mechanical features 108 of the device 100.

The links 302-310 may be formed from any solid material (e.g., metals, alloys, plastics, etc.) and may have any shape according to various applications of the device 300. For example, as shown, the link 304 has an L-shape, the links 302, 306 have a rectangular shape, and the link 310 has a circular (e.g., spherical, etc.) shape. Other shapes are possible as well.

The joints 312-322 may be configured to allow motion of the manipulator 324, the links 302-310, and/or other components of the device 300 relative to one another. For example, as shown, the joint 314 may allow motion of the link 302 relative to the link 304, the joint 316 may allow motion of the link 304 relative to the link 306, the joint 334 may allow motion of the link 306 relative to the link 308, and the joint 320 may allow motion of the link 308 relative to the link 310. Further, for example, the joint 312 may allow the manipulator 324 to rotate about a rotational axis perpendicular to a surface of the link 302, and the joint 322 may allow the link 310 to rotate about an axis perpendicular to a surface of the frame 326.

In practice, for example, the device 300 may include a plurality of actuators (not shown) coupled to the various links/manipulators to actuate the respective links/manipulators about a respective joint of the joints 312-322.

The manipulator 324 may include any manipulator configured to interact with an environment of the device 300. For example, as shown, the manipulator 324 may be a magnetic tool that is activated to attract metallic objects in the environment of the device 300. However, in some examples, the manipulator 324 may include or may be coupled to any other manipulator such as a robotic grasping tool or other end-effector.

The frame 326 may include any solid material (e.g., metal, plastic, wood, etc.) that has physical properties to allow supporting the various components of the device 300. Further, the frame 326 may have any shape or form suitable for various applications of the device 300.

The camera 328 may be configured to capture an image of some or all the components of the device 300. Although not shown in FIGS. 3A-3B, the device 300 may also include an actuator coupled to the camera 328 and configured adjust a viewing angle of the camera 328.

The mechanical features 330-336 may include any mechanical feature coupled to the device 300. For example, as shown, the features 330 and 332 may be screws that connect, respectively, the links 304 and 306 to the device 300. Further, for example, the features 334 and 336 may be indentations coupled, respectively, to the joints 318 and 320. Other types of mechanical features (not shown) are possible as well such as stickers, ridges, marks, or any other mechanical feature.

An example scenario that involves the device 300 performing the functions of the method 200 is as follows. The device 300 may adjust positions of the manipulator 324 and the links 302-310 to correspond to a particular arrangement. For example, the device 300 may adjust positions of the various hardware segments (i.e., links 302-310, manipulator 324, joints 314-322, etc.) from the arrangement shown in FIG. 3A to the arrangement shown in FIG. 3B. In this scenario, the device 300 may responsively determine physical parameters such as physical parameters of actuators thereof (not shown), or other parameters (e.g., sensor measurements, etc.), and may then generate an identification code for the device 300 based on the physical parameters.

As an example of physical parameters of actuators, consider actuators (not shown) A, B, C, D, E, F that are coupled, respectively, at the joints 312, 314, 316, 318, 320, 322, to affect, respectively, motion of the manipulator 324, the links 302, 304, 306, 308, 310. The actuators in this example may be each coupled to an encoder (not shown) that provides an encoder value in the range of 0 to 99 that corresponds to an orientation (or position) of the respective actuator. Thus, for example, in the arrangement of FIG. 3A, the outputs of the encoders of the actuators A, B, C, D, E, F may be, respectively, 23, 45, 62, 27, 48, and 76. Thus, an example identification code generated by the device 300 for the arrangement of FIG. 3A may be a concatenation of these values (e.g., "234562274876") or any other code that is calculated based on these values. Further, for example, in the arrangement of FIG. 3B, the outputs of the encoders of the actuators A, B, C, D, E, F may be, respectively, 23, 34, 86, 21, 39, and 76. Thus, an example identification code generated by the device 300 for the arrangement of FIG. 3B may also be a concatenation of these values (e.g., "233486213976") or any other code (e.g., hex code, Huffman code, etc.) that is calculated based on these values.

Other identification codes are possible as well. As a variation of the example above, alternatively or additionally to concatenation, the identification code may be generated by applying various mathematical operations to the measured encoder values (e.g., hashed computation, multiplication, addition, subtraction, etc.). For instance, the encoder values for actuators A, B, C, D, E, F may be multiplied with one another, processed by a hashing algorithm, or any other computation, to generate a key (i.e., the identification code) that is unique to the device 300.

Additionally or alternatively, as a variation of the example above, consider force sensors (not shown) G, H, I, J, K, L that are also coupled, respectively, at the joints 312, 314, 316, 318, 320, 322. For example, force sensor H may measure a force between the link 302 and the link 304, and the force sensor I may measure the force between the link 304 and the link 306, etc. Similarly, outputs of such force sensors may be utilized by the device 300 to generate the identification code. For example, in the arrangement of FIG. 3A, the outputs of the force sensors G, H, I, J, K, L may be, respectively, 12, 26, 32, 48, 59, 92. In turn, an example identification may thus be "122632485992." Further, for example, in the arrangement of FIG. 3B, the outputs of the force sensors G, H, I, J, K, L may be, respectively, 18, 29, 38, 52, 69, 98. Accordingly, in this example, the identification code may therefore be "182938526998." Other examples are possible as well depending on the configuration of the various force sensors and various formats of the identification code.

Additionally or alternatively, in this scenario, the device 300 may capture an image of itself using the camera 328. The image may indicate orientations of the mechanical features 330-336 that are unique to the device 300 when the various segments are at the particular arrangement. For example, the screws 330-332 may be fastened at particular orientations during assembly of the device 300. In turn, the orientations of the features 330-336 may also be included in the physical parameters, and utilized to generate the identification code similarly to the physical parameters and the sensor measurements in the examples above. For example, in the arrangement of FIG. 3A, the orientations of the features 330-336 relative to a reference angle may be, respectively, 26°, 35°, 21°, and 65°. In this example, an identification code may be "26352164." Further, for example, in the arrangement of FIG. 3B, the orientation of the features 330-336 may be 41°, 20°, 12°, and 52°. Thus, in this example, the identification code may be similarly generated as "41201252." Other examples are possible as well.

It is noted that some or all of the physical parameters in the examples above may be combined or omitted when the device 300 generates the identification code. For example, an identification code may indicate some or all of the encoder values, some or all of the sensor measurements, and/or some or all of the orientation measurements. Other combinations are possible as well depending on the physical parameters available for the device 300.

Further, it is noted that the identification code may be unique for the device 300. Consider by way of example a given robotic device that is configured and assembled similarly to the device 300. When hardware segments of the given robotic device are at an arrangement similar to the arrangement of FIG. 3A and/or the arrangement of FIG. 3B, the given robotic device may have different physical parameters. For example, orientations of features that correspond to the features 330-336 of the device 300 may be different. Further, for example, encoder values of actuators similar to the actuators above or sensors similar to the sensors above may also be different due to manufacturing/coupling variability between the given robotic device and the device 300. Accordingly, for example, the present disclosure may provide methods for generating a unique identification code for the device 300, as well as another unique identification code for the given robotic device.

Figure 4:
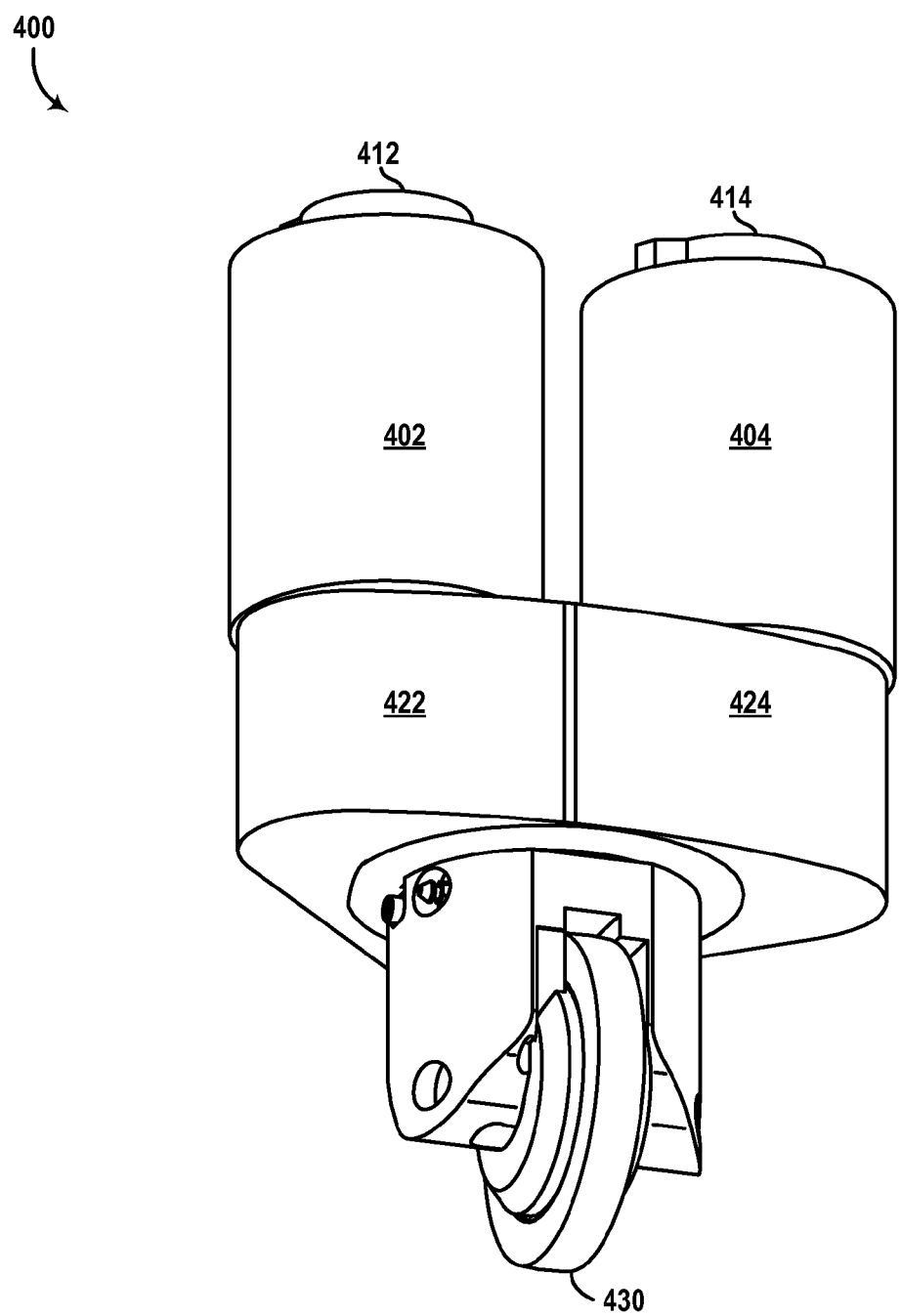
FIG. 4 illustrates another robotic device, according to an example embodiment.

FIG. 4 illustrates another robotic device 400, according to an example embodiment. The device 400 may be similar to the device 100 and may include some or all the components thereof. As shown, the device 400 includes actuators 402-404, encoders 412-414, gears 422-424, and wheel 430 that are similar, respectively, to the actuators 110, encoders 114, gears 112, and wheel 138 of the device 100.

As illustrated, the actuators 402-404 may actuate the wheel 430 along two degrees-of-freedom. For example, the actuator 402 may rotate the wheel about a rolling axis (e.g., forwards or backwards), and the actuator 404 may rotate the wheel about a steering axis to steer the wheel. Thus, in some embodiments, multiple actuators may be coupled to the same segment (e.g., the wheel 430) as illustrated in FIG. 4. However, in other embodiments (not shown), a single actuator may be coupled to each segment.

As illustrated, when the actuators 402-404 rotate, the gears 422-424 provide a gear ratio between rotations of the actuators 402-404 and rotations of the wheel 430 about respective axes of the wheel 430. Further, the encoders 412-414 may measure the rotation of the actuators 402-40 and provide the encoder data indicating motion or orientation of the actuators 402-404.

An example scenario where the device 400 performs functions of the method 200 is as follows. The device 400 may rotate the wheel 430 to a particular steering angle and/or a particular rolling motion. The device 400 may then measure the encoder values for positions/motion of the actuators 402-404 associated with the rotation of the wheel 430. Due to manufacturing/coupling variability, the encoder values may be unique for the device 400, and may therefore be utilized by the device 400 to generate an identification code for the device 400, for example.

Figure 5:
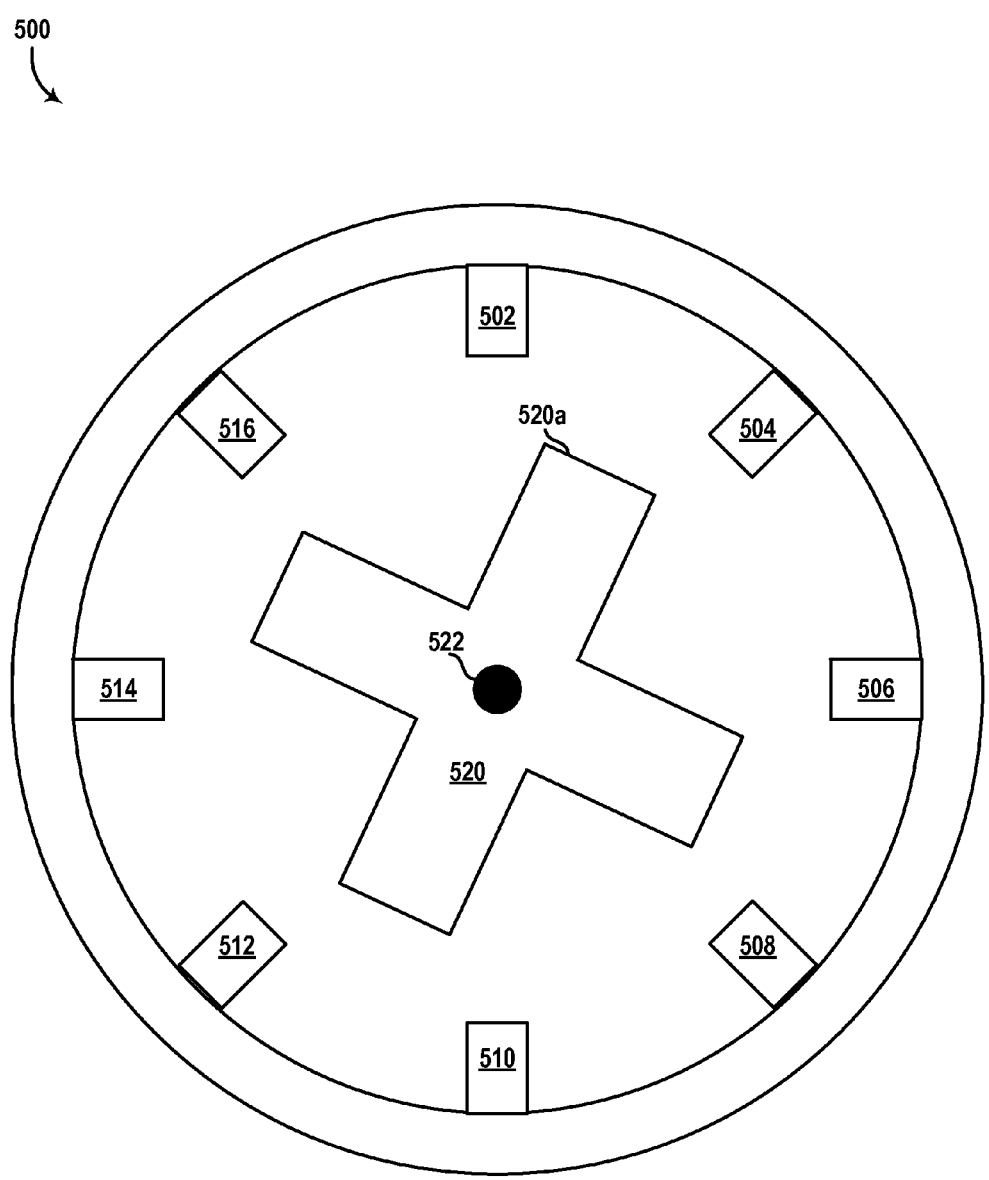
FIG. 5 illustrates an actuator, according to an example embodiment.

FIG. 5 illustrates an electric motor 500, according to an example embodiment. The electric motor 500 may be similar to the electric motor 144 of the device 100, and may be operated to perform some of the functions of the method 200, for example. As shown, the electric motor 500 includes a plurality of magnetic poles 502-516 and a rotor 520 that are similar, respectively, to the magnetic poles 146 and the rotor 148 of the device 100. The electric motor also includes a shaft 522. As shown, the electric motor 500 may be configured as a stepper motor. However, in some embodiments, other types of electric motors (e.g., linear motor, servo motor, etc.) may be adapted to perform functions of the present disclosure.

The magnetic poles 502-516 may be configured to provide a controlled magnetic field to affect motion of the rotor 520. For example, the poles 502-516 may include conductive coils that can be energized separately or synchronously by electric currents from a device such as the device 100 to provide a respective magnetic field.

In some examples, the rotor 520 may be formed from various materials such as permanent magnets or magnetically soft materials with salient poles that are affected by magnetic fields of the plurality of magnetic poles 502-516. Considering the arrangement of FIG. 5 by way of example, if the electric motor 500 energizes the magnetic pole 502, a side 520*a* of the rotor 520 may be attracted to the magnetic pole 502, and the rotor 520 may thereby align itself with the side 520*a* facing the magnetic pole 502 by rotating anticlockwise towards the magnetic pole 502. On the other hand, for example, if the electric motor 500 energizes the magnetic pole 504, the rotor 520 may rotate clockwise such that the side 502*a* is aligned with the magnetic pole 504. Other examples are possible as well such as varying the electric currents of the poles 502-516 to control speed of rotation of the rotor 520 among other examples.

The shaft 522, for example, may be a solid rod or other rigid component that extends at a first side outside the page to couple with an encoder (e.g., encoders 114), and extends at a second opposite side inside the page to couple with a segment (e.g., hardware segments 106). Alternatively, for example, both the encoder and the segment may be deployed at the same side of the shaft, or additional components (e.g., gears, etc.) may be coupled between the shaft and the segment. Other arrangements are possible as well in accordance with a configuration of the robotic device that includes the electric motor 500.

In line with the discussion above, physical parameters of the electric motor 500 may be unique and may therefore be utilized to generate an identification code for a robotic device that includes the electric motor 500. For example, electrical properties (e.g., resistance, etc.) of the conductive coils in the magnetic poles 502-516 may vary during manufacture, or distances between adjacent poles of the magnetic poles 502-516 may also vary during manufacture.

A scenario that involves using the electric motor 500 in accordance with methods and process herein is as follows. A robotic device that includes the electric motor 500 may energize one of the magnetic poles 502-516. In turn, the rotor 520 may rotate towards the energized magnetic pole. Further, an encoder coupled to the motor 500 may provide data indicating the position/motion of the rotor 520 responsive to energizing the one magnetic pole. Additionally, in the scenario, the robotic device may then sequentially energize other magnetic poles of the electric motor 500, and similarly record encoder values indicating the positions of the poles 502-516. Through this process, for example, an indication of the positions of the poles 502-516 may be determined for inclusion in physical parameters utilized to generate an identification code for the robotic device.

By way of example, the encoder values that correspond to the rotor 520 being at each of the poles 502-516 may correspond, respectively, to 3, 15, 29, 39, 52, 64, 79, 91. In this example, although the poles 502-516 appear to be arranged symmetrically in the motor 500 (e.g., adjacent poles may be separated by approximately 15 encoder ticks), the distances between adjacent poles may vary due to manufacturing variability. For example, the distance between poles 502 and 504 is 15−3=12 encoder ticks, and the distance between the poles 504 and 506 is 29−15=14 encoder ticks. Such variability may be unique to the electric motor 500, and a similarly manufactured motor may have different distances. Further, a different electric motor may have different offsets of the encoder values due to coupling the electric motor with a respective encoder. For example, while the pole 502 has the encoder value 3, a similar pole in a different motor may have the encoder value 6 due to different coupling between that motor and its encoder. Other examples are possible as well. Thus, in this example, an example identification code generated by a robotic device that includes the motor 500 may be a concatenation (e.g., "0315293952647991") or other calculated code involving these values.

As a variation of the example above, the identification code may alternatively utilize deviations of the encoder values from the mean to reduce predictability of the identification code. For instance, where a given pole of the poles 502-516 is expected to be separated by 15 encoder ticks to an adjacent pole, the deviation for the encoder value 15 of the pole 504 may be computed as 15−(3+15)=−3. The other deviations may be similarly computed. In turn, rather than utilizing the encoder values 3, 15, 29, 39, 52, 64, 79, 91 of the poles 502-516 to compute the identification code, the robotic device may utilize the values 3, −3, −1, −5, −2, −3, 0, −3. Through this process, predictability of the identification code may be reduced by utilizing the deviations instead of the actual encoder values. For instance, the identification code may be computed by a pre-determined operation applied to the various deviations. For example, if the pre-determined operation for encoder values A, B, C, D, E, F, G, H is A+(B+C)*(D+E)+(F+G)*H, the identification code for the motor 500 may be 3+(−3+−1)*(−5+−2)+(−3+0)*−3=−28. Other operations/computations (e.g., hashing algorithm, etc.) are possible as well according to various configurations of the robotic device that includes the motor 500.

Further, in some examples, the complexity/uniqueness of the identification code may be improved by using the values of the deviations and/or the encoder values to order the encoder values in the identification code. For example, a deviation value of −3 may signal to the robotic device to utilize an encoder reading for a pole position in motor 3 of the robotic device as the next encoder value in the identification code computation (e.g., the pre-determined operation, etc.). Other examples are possible as well. Through this process, for example, the uniqueness of the generated identification code may be further enhanced.

Figure 6:
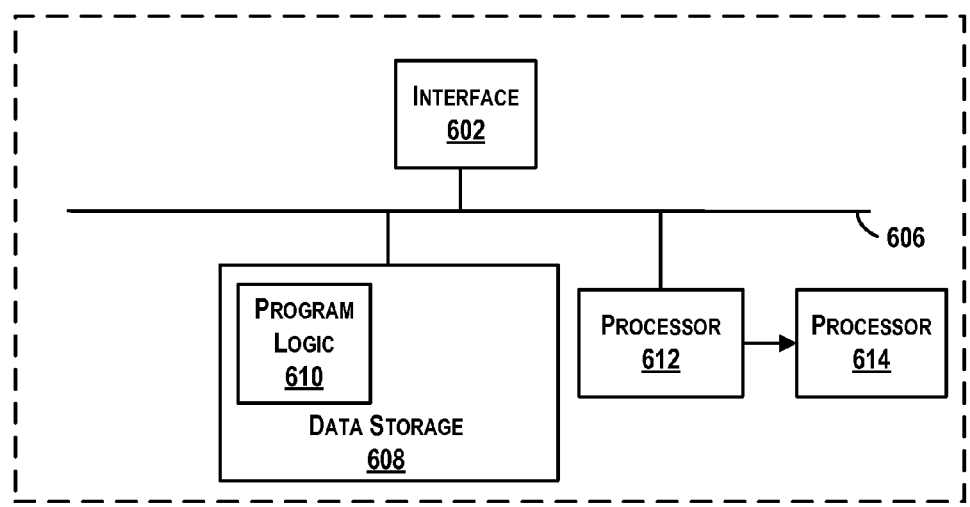
FIG. 6 is a block diagram of a computing device, according to an example embodiment.

FIG. 6 is a block diagram of a computing device 600, according to an example embodiment. The computing device 600 may be configured to operate at least some components of the devices 100, 300, 400, the electrical motor 500 in accordance with methods and process herein such as the method 200, for example. In one example, the computing device 600 may correspond to the computer system 122 of the device 100. In another example, the computing device 600 may be configured to assist operation of a robotic device, such as devices 100, 300, 400. For example, the computing device 600 may be an external computing device that provides instructions to operate the devices herein in accordance with the method 200. In yet another example, the computing device 600 may be an external computing device in communication with a robotic device such as devices 100, 300, 400. For example, the device 600 may obtain an identification code from the device 100 in accordance with the method 200, and may thereby provide authenticated connectivity to the device 100. Other examples are possible as well.

In some examples, some components illustrated in FIG. 6 may be distributed across multiple computing devices (e.g., desktop computers, servers, hand-held devices, etc.). However, for the sake of example, the components are shown and described as part of one example device 600.

The device 600 may include an interface 602, data storage 608, and a processor 612. Components illustrated in FIG. 6 may be linked together by a communication link 606. In some examples, the device 600 may include hardware to enable communication within the device 600 and between the device 600 and another computing device (not shown), such as the devices 100, 300, and/or 400. The hardware may include transmitters, receivers, antennas, and/or wiring, for example.

The interface 602 may be configured to allow the device 600 to communicate with another computing device (not shown), such as a robotic device, or with a user of the device 600, for example. Thus, the interface 602 may be configured to receive input data from one or more devices (or users), and may also be configured to send output data to the one or more devices. In some examples, the interface 602 may also maintain and manage records of data received and sent by the device 600. In other examples, records of data may be maintained and managed by other components of the device 600. The interface 602 may also include a receiver and transmitter to receive and send data. In some examples, the interface 602 may also include a user-interface, such as a keyboard, microphone, touch screen, etc., to receive inputs as well. Further, in some examples, the interface 602 may also include interface with output devices such as a display, speaker, etc. Further, in some examples, the interface 602 may include wired communication components (e.g., USB ports, parallel ports, Ethernet interface, etc.) or wireless communication components (e.g., WiFi interface, Bluetooth interface, etc.). Thus, for example, the interface 602 may allow the device 600 to communicate with another device, such as the device 100 of FIG. 1.

The processor 612 may be configured to operate the device 600. For example, the processor 612 may be configured to cause the device 600 to provide a request to a robotic device for an identification code, and/or to receive the identification code from the robotic device. Further, the processor 612 may also be configured to operate other components of the device 600 such as input/output components or communication components. The device 600 is illustrated to include an additional processor 614. The processor 614 may be configured to control some of the aspects described for the processor 612. For example, the processor 614 may be a controller that operates the interface 602, and the processor 818 may be configured to control other aspects such as the data storage 608. Some embodiments may include only one processor (e.g., processor 612) or may include additional processors configured to control various aspects of the device 600.

The data storage 608 may store program logic 610 that can be accessed and executed by the processor 612 and/or the processor 614. For example, the program logic 610 may include instructions for any of the functions described herein for the devices 100, 300, 400, or any component thereof. Additionally or alternatively, for example, the program logic 610 may include any of the functions described herein for the method 200 and/or other process herein.

The communication link 606 is illustrated as a wired connection; however, wireless connections may also be used. For example, the communication link 606 may be a wired serial bus such as a universal serial bus or a parallel bus, or a wireless connection using, e.g., short-range wireless radio technology, communication protocols described in IEEE 802.11 (including any IEEE 802.11 revisions), or cellular wireless technology, among other possibilities.

Figure 7:
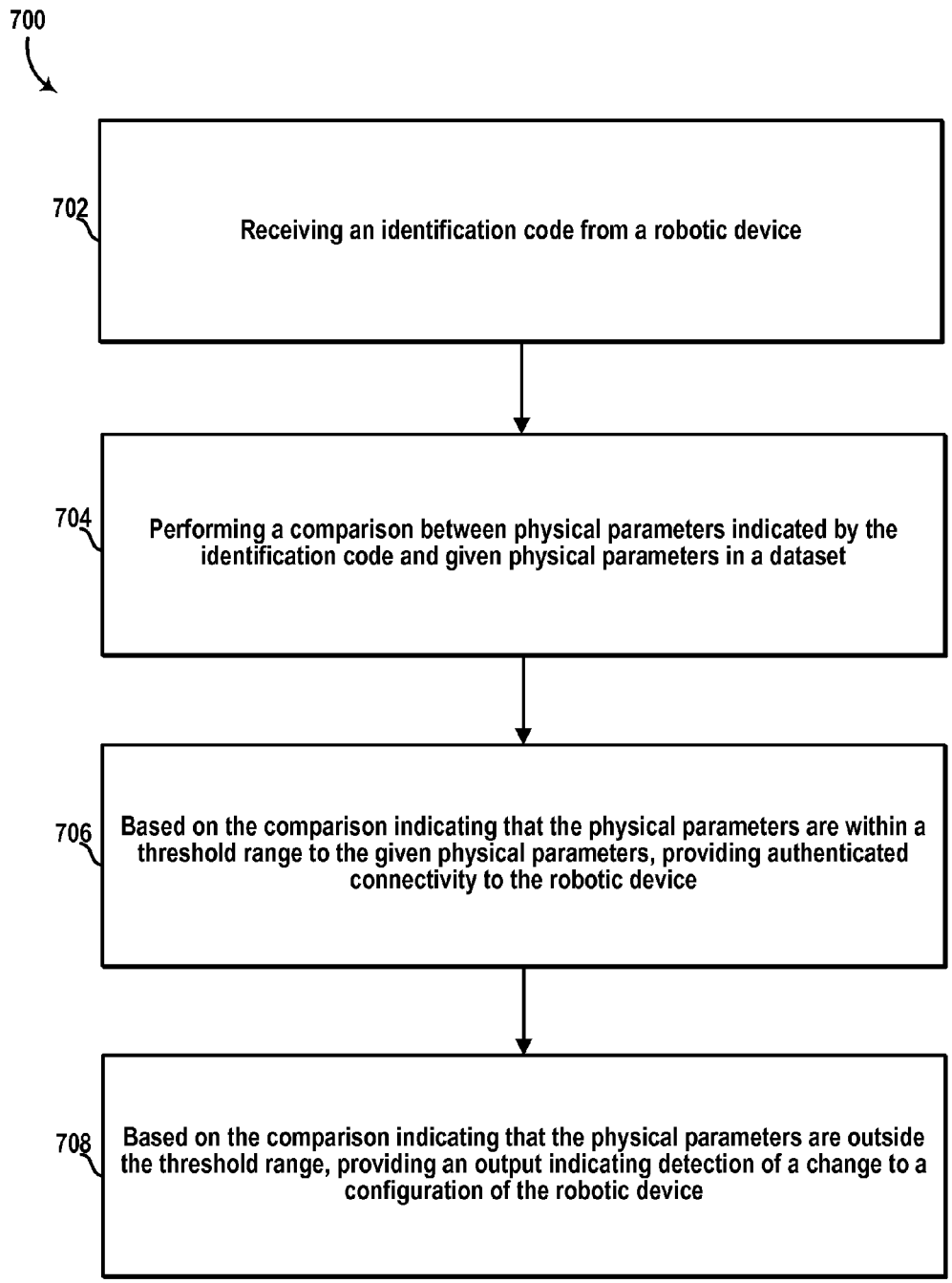
FIG. 7 is a block diagram of another method, according to an example embodiment.

FIG. 7 is a block diagram of another method 700, according to an example embodiment. Method 700 shown in FIG. 7 presents an embodiment of a method that could be used the devices 100, 300, 400, 600, and the electric motor 500, for example. Method 700 may include one or more operations, functions, or actions as illustrated by one or more of blocks 702-708. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In some examples, a robotic device such as the device 100 may be in communication with an external computing device for various reasons. In one example, the external computing device may be a control computer that operates the robotic device. In another example, the external computing device may be a maintenance computer that provides updates/upgrades to the robotic device. In yet another example, the external computing device may be a network computer that provides connectivity to the robotic device to one or more networks (e.g., Internet, etc.). In these examples and other similar examples, the robotic device may provide an identification code (e.g., private/public key) to the external computing device to receive authenticated connectivity or to verify authenticity of the robotic device.

In some examples, the method 700 may provide a mechanism to facilitate such communication between a robotic device and an external computing device. Thus, functions of the method 700, for example, may be performed by an external computing device similar to the computing device 600 of FIG. 6 that is in communication with a robotic device similar to the device 100 of FIG. 1.

At block 702, the method 700 includes receiving an identification code from a robotic device. The robotic device, for example, may be similar to the device 100. Accordingly, the robotic device may include a plurality of segments (e.g., hardware segments 106), and may generate the identification code similarly to the identification code generated at block 206 of the method 200. In some examples, the identification code may be indicative of physical parameters of the robotic device that are associated with the plurality of segments being in a particular arrangement, similarly to the physical parameters at block 204 of the method 200.

In turn, a computing device such as the device 600 may receive the identification code at block 702. For example, the computing device may include one or more processors similar to the processor 612, and may receive the identification via a communication interface similar to the interface 602 and/or a communication link similar to the communication link 606.

In some examples, the method 700 may also include providing an indication of the particular arrangement to the robotic device. By way of example, the computing device of the method 700 may indicate the particular arrangement to the robotic device (e.g., the arrangement shown in FIG. 3A, etc.), the robotic device may then actuate its segments to that particular arrangement, and then measure the corresponding physical parameters to generate the identification code. Further, in this example, the robotic device may then provide that generated identification code to the computing device of the method 700. Thus, in these examples, receiving the identification code at block 702 may be responsive to providing the indication of the particular arrangement to the robotic device.

At block 704, the method 700 includes performing a comparison between physical parameters indicated by the identification code and given physical parameters in a dataset. The dataset, for example, may be accessible to the computing device of the present method (e.g., stored in a memory, stored in data storage 608, etc.). For example, the given physical parameters may be a pre-determined set of parameters that were measured when the robotic device was manufactured and stored in the dataset. Other examples are possible as well.

In some embodiments, the physical parameters may be provided to the computing device as a hashed computation of calculated values of encoders and/or other physical parameters. Accordingly, in these embodiments, the comparison at block 704 may involve utilizing a hash table or other algorithm to perform the comparison between the physical parameters and the given physical parameters. Alternatively or additionally, the hashed computation of the physical parameters may be compared with a corresponding hashed computation of the given physical parameters.

At block 706, the method 700 includes providing authenticated connectivity to the robotic device based on the comparison indicating that the physical parameters are within a threshold range to the given physical parameters. Considering the arrangement of FIG. 3A by way of example, the physical parameters may indicate orientations of screws 330-332 as well as other physical parameters of the device 300 (e.g., actuators, etc.) when the device 300 is at the particular arrangement of FIG. 3A. In this example, the computing device of the method 700 may then compare these orientations/physical parameters with stored parameters (e.g., the given physical parameters) to identify the robotic device and/or determine that the robotic device is authorized to receive the authenticated connectivity.

Further, in some examples, a tolerance level may be accounted for (e.g., the threshold range) to allow for slight variations of the orientations of the screws 330-332 in the image obtained by the camera 328 due to variability of the camera 328, or for other variations of other physical parameters. For example, if a given orientation of the screw 330 in the given physical parameters is 21°, and the orientation of the screw 330 computed by the robotic device based on the image is 22°, the discrepancy between the two values may be due to the computation by the robotic device (e.g., image processing techniques may introduce errors, etc.). Thus, in this example, the threshold range may be 19°-23° (i.e., +/−2°) to account for such errors. Similarly, in some examples, the threshold range for an actuator orientation indicated by an encoder value may also be utilized for similar reasons. For example, the threshold range for encoder readings may be +/−1 encoder tick. However, in some examples, the threshold range may be different according to various expected errors or other factors.

In some examples, the method 700 may also include providing operation instructions to the robotic device responsive to providing the authenticated connectivity. For instance, the robotic device may be one of several robotic devices in a warehouse, and the computing device may authenticate the robotic device based on the comparison at block 704, then tether the robotic device (e.g., provide the authenticated connectivity at block 706, etc.) according to a control algorithm of the computing device, and then provide instructions for the robotic device to perform a certain task in the warehouse (e.g., move objects, etc.).

At block 708, the method 700 includes providing an output indicating detection of a change to a configuration of the robotic device based on the comparison indicating that the physical parameters are outside the threshold range. Continuing with the example above, the configuration of the robotic device may have changed since the given physical parameters were stored in the dataset. For instance, a user of the robotic device may have repaired and/or maintained the robotic device at an unauthorized facility. In turn, for instance, orientations of the screws 330-332 or physical parameters of actuators (not shown) may have changed due to the unauthorized maintenance. Accordingly, in this example, the computing device of the method 700 may provide the output, such as a message on a display or the like, that indicates that a warranty of the robotic device is void or that a change to the configuration of the robotic device was detected.

Figure 8:
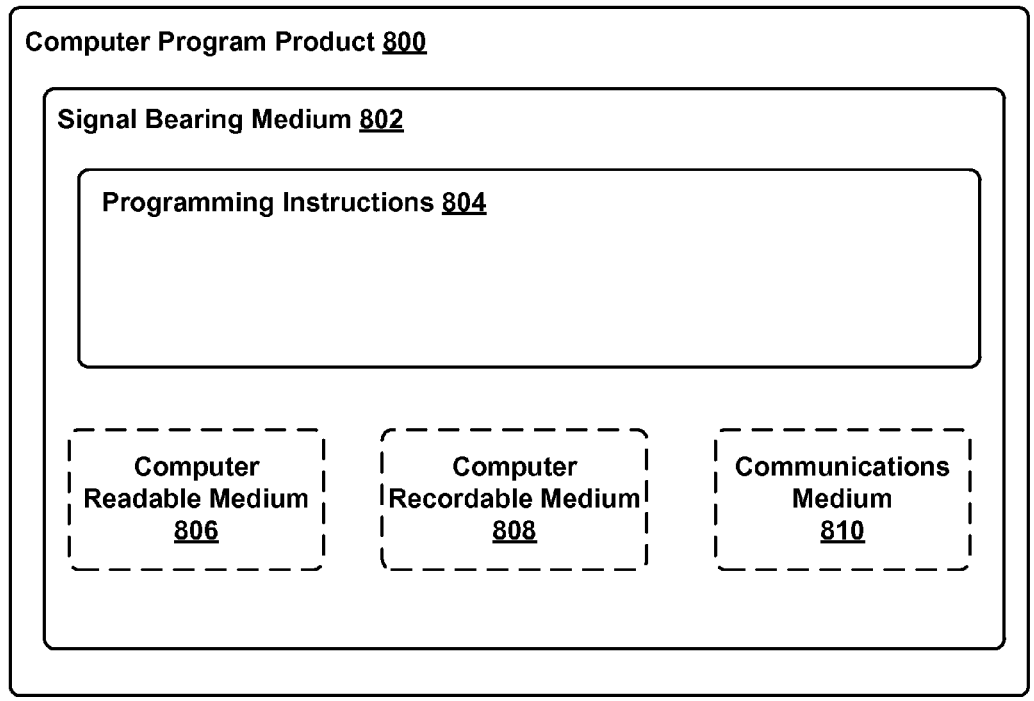
FIG. 8 depicts an example computer readable medium configured according to an example embodiment.

FIG. 8 depicts an example computer readable medium configured according to an example embodiment. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g., functions methods 200, 600, etc.) may be implemented by computer program instructions encoded on a computer readable storage media in a machine-readable format, or on other media or articles of manufacture (e.g., instructions 174 of the device 100, program logic 610 of the device 600, etc.). FIG. 8 is a schematic illustrating a conceptual partial view of an example computer program product that includes a computer program for executing a computer process on a computing device, arranged according to at least some embodiments disclosed herein.

In one embodiment, the example computer program product 800 is provided using a signal bearing medium 802. The signal bearing medium 802 may include one or more programming instructions 804 that, when executed by one or more processors may provide functionality or portions of the functionality described above with respect to FIGS. 1-7. In some examples, the signal bearing medium 802 may be a computer-readable medium 806, such as, but not limited to, a hard disk drive, a Compact Disc (CD), a Digital Video Disk (DVD), a digital tape, memory, etc. In some implementations, the signal bearing medium 802 may be a computer recordable medium 808, such as, but not limited to, memory, read/write (R/W) CDs, R/W DVDs, etc. In some implementations, the signal bearing medium 802 may be a communication medium 810 (e.g., a fiber optic cable, a waveguide, a wired communications link, etc.). Thus, for example, the signal bearing medium 802 may be conveyed by a wireless form of the communications medium 810.

The one or more programming instructions 804 may be, for example, computer executable and/or logic implemented instructions. In some examples, a computing device may be configured to provide various operations, functions, or actions in response to the programming instructions 804 conveyed to the computing device by one or more of the computer readable medium 806, the computer recordable medium 808, and/or the communications medium 810.

The computer readable medium 806 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A device comprising:
a plurality of hardware segments;
a plurality of actuators to actuate the plurality of hardware segments; and
a controller to cause at least one of the plurality of actuators to adjust positions of at least one of the plurality of hardware segments to correspond to a particular arrangement, to determine physical parameters of the device based on the adjustment of the positions, and to generate a unique identification code for the device based on the physical parameters having manufacturing or coupling variability, wherein the physical parameters include one or more of electrical parameters of the plurality of actuators or mechanical parameters of the plurality of actuators.

2. The device of claim 1, further comprising:
a plurality of encoders coupled to the plurality of actuators to provide data indicative of motion or orientation of the plurality of actuators about axes of the plurality of actuators, wherein the physical parameters include the motion or the orientation indicated by the data from the plurality of encoders.

3. The device of claim 2, wherein the plurality of actuators include an electric motor having a plurality of magnetic poles, and wherein the controller is configured to energize one magnetic pole of the plurality of magnetic poles, and wherein the data from the plurality of encoders is indicative of the motion or the orientation of the electric motor responsive to energizing the one magnetic pole.

4. The device of claim 1, wherein the plurality of actuators include an electric motor having a plurality of magnetic poles, wherein the controller determines positions of the plurality of magnetic poles, and wherein the physical parameters include the positions of the plurality of magnetic poles.

5. The device of claim 1, further comprising:
one or more mechanical features coupled to one or more of the plurality of hardware segments; and
a camera configured to provide an image of the one or more mechanical features based on the at least one of the plurality of hardware segments being in the particular arrangement, wherein the physical parameters include orientations of the one or more mechanical features indicated in the image provided by the camera.

6. The device of claim 1, wherein the plurality of actuators include one or more of electric motors, hydraulic motors, or pneumatic actuators.

7. The device of claim 1, wherein the controller receives an indication of the particular arrangement from an external computing device.

8. The device of claim 1, wherein the controller provides the identification code to an external computing device, and wherein the controller receives authenticated connectivity with the external computing device responsive to provision of the identification code.

9. The device of claim 1, wherein the plurality of hardware segments include a robotic arm, a robotic joint, a robotic link, a robotic manipulator, or a wheel.

10. A method comprising:
adjusting, by a robotic device that includes one or more processors, positions of at least one of a plurality of hardware segments in the robotic device to correspond to a particular arrangement, wherein the robotic device includes a plurality of actuators to actuate the plurality of hardware segments;
determining physical parameters of the robotic device based on the adjustment of the positions, wherein the physical parameters include one or more of electrical parameters of the plurality of actuators or mechanical parameters of the plurality of actuators; and
generating a unique identification code for the robotic device based on the physical parameters having manufacturing or coupling variability.

11. The method of claim 10, further comprising:
determining, based on a plurality of encoders coupled to the plurality of actuators, data indicative of motion or orientation of the plurality of actuators about axes of the plurality of actuators, wherein the physical parameters include the motion or the orientation indicated by the data from the plurality of encoders.

12. The method of claim 11, wherein the plurality of actuators include an electric motor having a plurality of magnetic poles, the method further comprising:
providing, to one magnetic pole of the plurality of magnetic poles, an electric current to energize the one magnetic pole, wherein the data from the plurality of encoders is indicative of the motion or the orientation of the electric motor responsive to providing the electric current to the one magnetic pole.

13. The method of claim 10, wherein the plurality of actuators include an electric motor having a plurality of magnetic poles, the method further comprising:
determining positions of the plurality of magnetic poles, wherein the physical parameters include the positions of the plurality of magnetic poles.

14. The method of claim 10, further comprising:
obtaining, from a camera in the robotic device, an image of one or more mechanical features coupled one or more of the plurality of hardware segments, wherein obtaining the image is based on the at least one of the plurality of hardware segments being in the particular arrangement, and wherein the physical parameters include orientations of the one or more mechanical features indicated in the image from the camera.

15. The method of claim 10, further comprising receiving an indication of the particular arrangement from an external computing device.

16. The method of claim 10, further comprising:
providing the identification code to an external computing device; and
receiving authenticated connectivity with the external computing device responsive to provision of the identification code.

* * * * *